E. J. BELEAL.
FLY POISONER.
APPLICATION FILED SEPT. 27, 1916.
1,228,170.
Patented May 29, 1917.
2 SHEETS—SHEET 1.
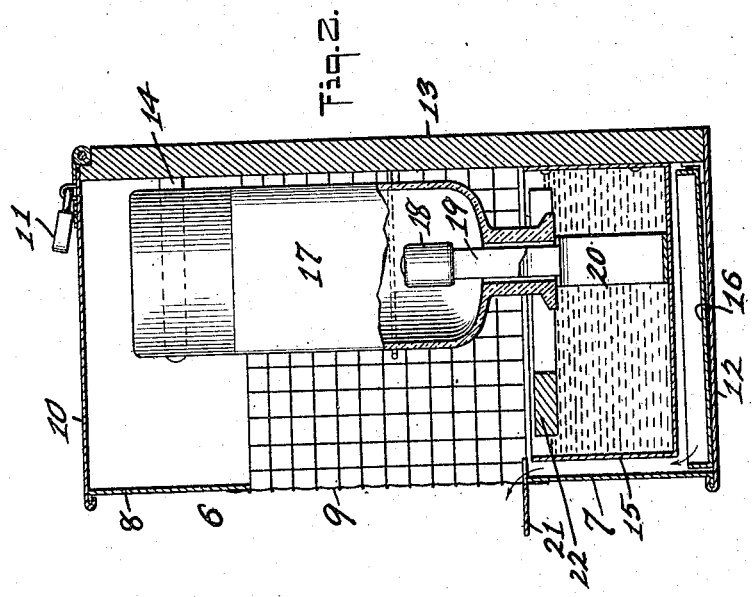
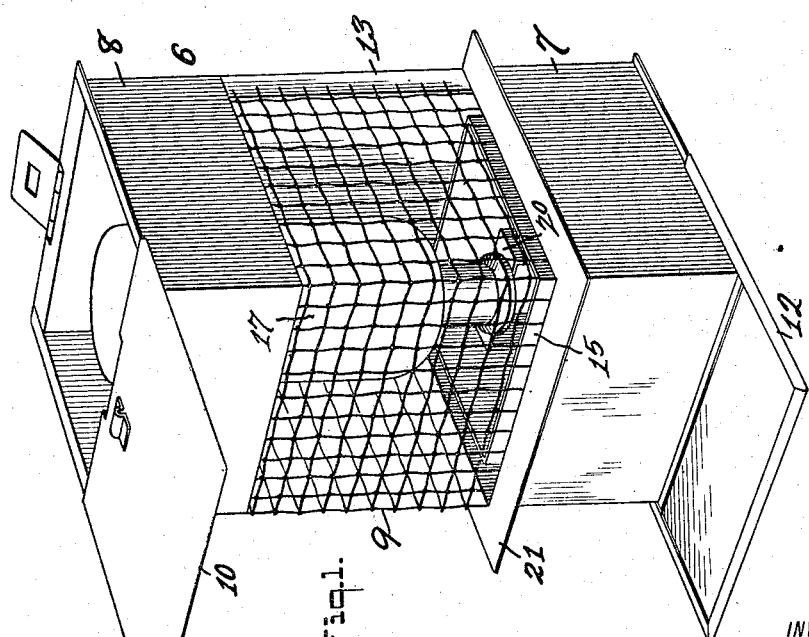
WITNESSES
INVENTOR
E. J. Beleal
BY
ATTORNEYS E. J. BELEAL.
FLY POISONER.
APPLICATION FILED SEPT. 27, 1916.
1,228,170.
Patented May 29, 1917.
2 SHEETS—SHEET 2.
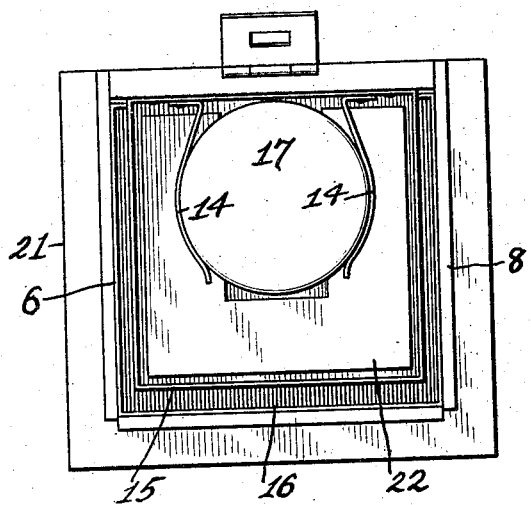
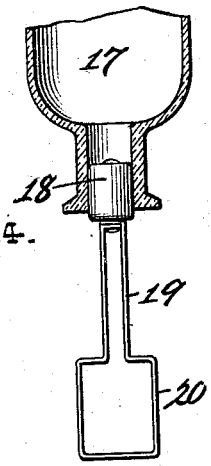
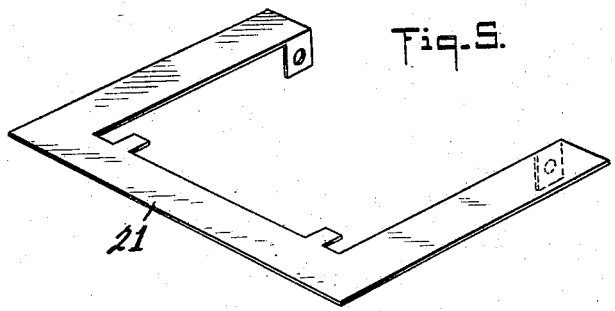
WITNESSES
INVENTOR
E. J. Beleal
BY
ATTORNEYS

UNITED STATES PATENT OFFICE.

ERNEST J. BELEAL, OF VALLEY CITY, NORTH DAKOTA.

FLY-POISONER.

1,228,170.  Specification of Letters Patent.  Patented May 29, 1917.

Application filed September 27, 1916. Serial No. 122,496.

*To all whom it may concern:*

Be it known that I, ERNEST J. BELEAL, a citizen of the United States, and a resident of Valley City, in the county of Barnes and State of North Dakota, have invented certain new and useful Improvements in Fly-Poisoners, of which the following is a specification.

My invention relates to means for killing insects, especially flies, and the main object thereof is to provide a poison holding tank and means for automatically maintaining the same at a desired level arranged within a container positively preventing access thereto, as by children or pets, and which container is also provided with means for attracting the flies to the container.

My invention is fully described in the following specification, of which the accompanying drawings form a part, in which like characters refer to like parts in each of the views, and in which:—

Figure 1 is a perspective view of my invention, with the cover open to permit the introduction of a bottle containing a poisonous liquid;

Fig. 2 is a vertical section therethrough, with the cover closed and locked;

Fig. 3 is a top plan view thereof, with the cover omitted;

Fig. 4 is a section taken through a bottle provided with a combined stopper and valve which I employ; and Fig. 5 is a detached view of a shelf which I provide for the insects to alight upon.

Referring to the drawings, 6 represents a casing having a lower sheet metal or wood member 7, an upper sheet metal or wood member 8, a joining member 9 of wire mesh, a hinged cover 10 on the member 8, a lock 11 therefor, a removable bottom 12 slidably mounted, and a solid back plate 13 which carries two spring arms 14 adjacent its top jointly forming a bottle clip, a poison tank 15 adjacent its lower end, and brackets 16 at its lower end serving as a rest for a pan 16 adapted to contain a fluid or other substance having an odor attractive to flies or other insects, the forward end of said pan resting directly upon the removable bottom 12, Fig. 2.

Steadied by the clip arms 14 is a bottle 17, inverted, having a stopper 18, Fig. 4, carried by a frame 19 adapted to enter the bottle neck, Fig. 2, to a point where an enlarged portion 20 abuts on the outer end of the bottle neck, thereby moving the stopper 18 well within the bottle and clear of the neck to permit the escape of the poisonous fluid contained in the bottle, this stopper movement being accomplished when the bottle is placed in the casing 6 with the enlarged portion 20 of the frame 19 resting upon the bottom of the poison tank 15 by the downward movement of the bottle.

When the bottle is in the position shown in Fig. 2 the poisonous liquid is free to escape therefrom into the tank 15 until the level of the liquid rises above the open end of the bottle neck, thereby causing a seal for the bottle until the level of the liquid drops below the bottle neck, as by evaporation, at which time the liquid again passes from the bottle to the tank until the seal is again effective, a constant level of the liquid in the tank being thus automatically insured.

Arranged exteriorly of the casing, below the wire mesh 9, is a shelf 21 provided for the insects to alight upon when attracted by the matter in the pan 16 and, after entering the casing through the wire mesh, the insects partake of the poisonous liquid in the tank 15 which liquid is made attractive as a food and I also provide a float 22 for the insects to stand upon while partaking of the poisoned liquid, and said liquid is preferably of a slow poisoning character whereby the insects may leave the casing after partaking of the poisoned liquid to die at a distance from the device, thus avoiding the necessity for frequent removal of dead insects from the casing and maintaining the latter in a cleanly and attractive condition.

My invention is very simple though highly effective and permits of ready substitution of a filled bottle, or its equivalent, for an empty one, and the pan 16 may be readily removed whenever desired by merely removing the sliding bottom 12 of the casing.

While I have shown the device as adapted to stand upon a convenient support, I may also suspend the same from a wall, post, or the like, in any place frequented by flies or other insects, and I may make any desired changes over the structure shown and described provided such changes do not depart from the spirit of the invention and come within the scope of the appended claims.

Having fully described my invention, what I claim as new, and desire to secure by Letters Patent, is:—

1. A device of the class described, comprising a casing formed of upper and lower imperforate members and an interposed foraminous member, a horizontal shelf at the top of said lower member, a tank having its upper edge in the approximate plane of said shelf and adapted to contain a poisonous liquid, a removable bottom, and a bait pan beneath said tank.

2. A device of the class described, comprising a casing formed of upper and lower imperforate members and an interposed foraminous member, a shelf at the top of said lower member exteriorly of said casing, a tank having its upper edge in the approximate plane of said shelf and adapted to contain a poisonous liquid, a float in said tank for flies to stand upon while drinking said liquid, a removable bottom, and a bait pan beneath said tank.

3. A device of the class described, comprising a casing formed of upper and lower imperforate members and an interposed foraminous member, a shelf at the top of said lower member, a tank for a poisonous liquid having its top in the approximate plane of said shelf, a removable bottom, a bait pan beneath said tank, and a cover for said casing to prevent access to the interior thereof by children.

ERNEST J. BELEAL.

Witnessed and signed in presence of—
M. J. ENGLERT,
JOSEPHINE EFTELAND.

Copies of this patent may be obtained for five cents each, by addressing the "Commissioner of Patents, Washington, D. C."